(12) United States Patent
Griffin et al.

(10) Patent No.: US 7,167,969 B2
(45) Date of Patent: Jan. 23, 2007

(54) APPARATUS AND METHOD FOR WRITING DATA TO MIRRORED STORAGE USING MULTIPLE TASKS WORKING IN PARALLEL

(75) Inventors: Kevin Curtis Griffin, Rochester, MN (US); Scott Dennis Helt, Rochester, MN (US); Glen Warren Nelson, Rochester, MN (US); Mark Philip Piazza, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 10/671,035

(22) Filed: Sep. 25, 2003

(65) Prior Publication Data
US 2005/0071584 A1    Mar. 31, 2005

(51) Int. Cl.
*G06F 12/00*    (2006.01)
(52) U.S. Cl. .............. 711/203; 710/200; 710/310; 711/114; 711/209; 711/161; 711/162
(58) Field of Classification Search ............... None
See application file for complete search history.

(56) References Cited

U.S. PATENT DOCUMENTS 5,899,994 A * 5/1999 Mohamed et al. .......... 707/100

* cited by examiner

*Primary Examiner*—Reginald Bragdon
*Assistant Examiner*—Ngoc Dinh
(74) *Attorney, Agent, or Firm*—Martin & Associates, LLC; Derek P. Martin (57) ABSTRACT

An apparatus and method provides the capability of mirroring storage from a primary system to a mirrored system in a way that uses parallelism in the mirrored system to maximize the efficiency of writing data to the mirrored storage for operations that do not conflict while serializing operations that do conflict. The mirroring of the present invention is "logical mirroring", which does not require identical disk drives, and which supports mirroring between geographically remote locations to protect against catastrophic site failure. Parallelism is achieved in the mirrored system by dividing the virtual address space into multiple ranges, and by assigning a group of tasks to each range. When an operation is received on the mirrored system, the virtual address range that the operation affects is determined, and the operation is then delegated to the task group that corresponds to the affected virtual address range. By dividing the virtual address space into ranges, tasks in different ranges (i.e., in different task groups) may execute in parallel without any threat of conflict, and even tasks within the same range may execute in parallel if they operate in different portions of the range.

28 Claims, 7 Drawing Sheets

Logical Mirroring

| Active Task Table |||
|---|---|---|
| Task B | Range F | Counter Pointer G |
| Task D | Range H | Counter Pointer K |
| Task P | Range J | Counter Pointer M |
| Task R | Range T | Counter Pointer Q |

FIG. 10

|  |  |
|---|---|
| Dequeue from the mini-Q | 1102 |
| If mini-Q has entry | 1104 |
|    process entry | 1106 |
|    go back to top | 1108 |
| Else | 1110 |
|    get table lock | 1112 |
|    dequeue from mini-Q again | 1114 |
|    If mini-Q has entry | 1116 |
|      drop the table lock | 1118 |
|      process the mini-Q entry | 1120 |
|      go back to top | 1122 |
|    Else | 1124 |
|      If pointer to counter is set | 1126 |
|        send to counter | 1128 |
|        NULL pointer to counter | 1130 |
|    Take entry for this task out of the table (if not previously done) | 1132 |
|    Drop the table lock | 1134 |
|    Get the main-Q lock | 1136 |
| (A)  Receive message from main-Q | 1138 |
|    Get the table lock | 1140 |
|    Look in the table | 1142 |
|    If there is a matching range in the table | 1144 |
|      If it only matches/overlaps 1 range in the table | 1146 |
|        Update table with expanded range, if necessary | 1148 |
|        Send the message to the mini-Q of the task handling that range | 1150 |
|        Drop the table lock | 1152 |
|        Go back to (A) | 1154 |
|      Else (it matches more than 1 range) | 1160 |
|        Update table for tasks being waited on to have pointer to this task's counter | 1162 |
|        Clear ranges for those other tasks in the table | 1164 |
|        Set range for this task to cover start and end of all other ranges plus this new one | 1166 |
|        Set counter up with counts of tasks being waited on | 1168 |
|        Drop the table lock | 1170 |
|        Drop the main-Q lock | 1172 |
|        Wait on the counter | 1174 |
|    Else | 1176 |
|      Take range for himself (update the table) | 1178 |
|      Drop table lock | 1180 |
|      Drop the main-Q lock | 1182 |
|    Process the new message | 1184 |
|    Go back to the top | 1186 |

FIG. 11

APPARATUS AND METHOD FOR WRITING DATA TO MIRRORED STORAGE USING MULTIPLE TASKS WORKING IN PARALLEL

BACKGROUND OF THE INVENTION

1. Technical Field

This invention generally relates to data processing, and more specifically relates to the mirroring of storage in a computer system.

2. Background Art

Since the dawn of the computer age, computer systems have evolved into extremely sophisticated devices that may be found in many different settings. Many computer systems include critical data that must not be lost if a failure in the computer system occurs. In the prior art, the concept of "mirroring" is known. Two identical disk drives are typically installed on a computer system. One is designated primary storage, while the other is designated mirrored storage. For each write to the primary storage disk drive, a corresponding write of the same data to the same physical location is made to the mirrored storage disk drive. Thus, the mirrored storage becomes a "mirror image" of the primary storage. Should the primary storage fail, the mirrored storage could then be used, because the mirrored storage contains the same data in the same physical locations as the primary storage.

Figure 2:
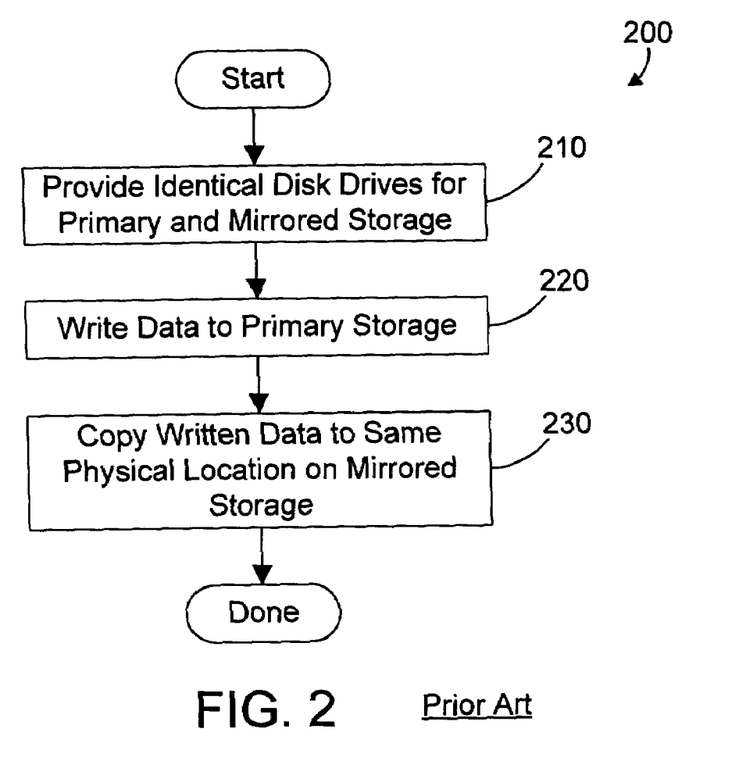
FIG. 2 is a flow diagram of a prior art method for local mirroring.

A prior art method 200 for local (or physical) mirroring is shown in FIG. 2. Identical disk drives are provided (step 210). Data is written to primary storage (step 220). The data written to primary storage is then copied to the same physical location on the mirrored storage (step 230). In this manner, the mirrored storage is an exact copy, down to the sector level, of the primary storage. Such a system 300 is shown in block diagram form in FIG. 3. The computer system 300 includes primary storage 310 and mirrored storage 320 that are identical disk drives. When data is written to primary storage 310, the data is then copied to the same physical location on mirrored storage 320.

Figure 3:
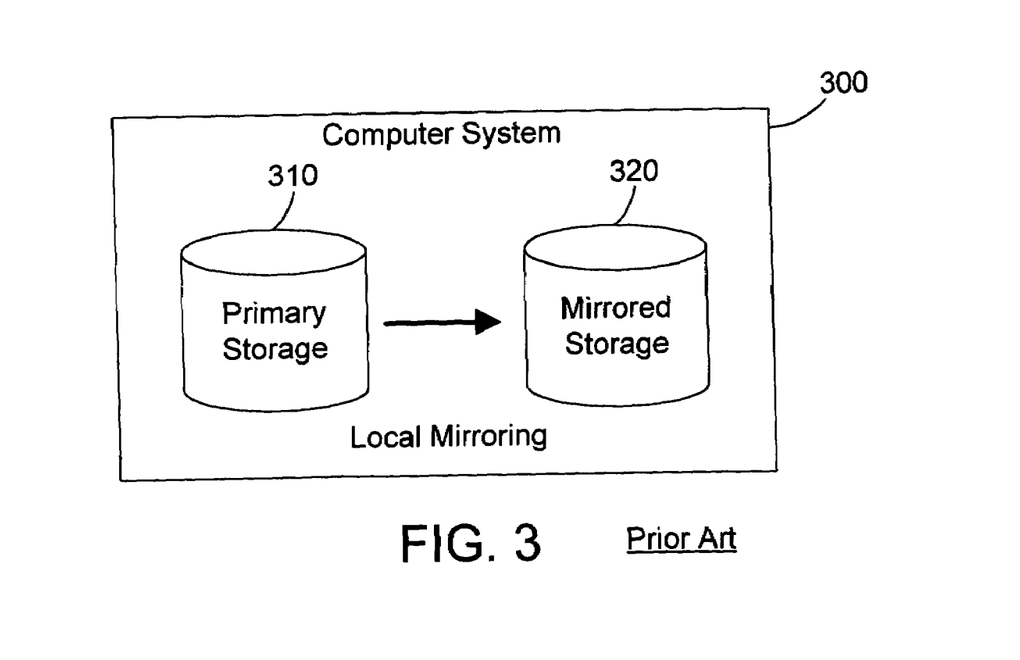
FIG. 3 is a block diagram of a prior art computer system that performs local mirroring.

Two problems exist with the local mirroring as shown in FIGS. 2 and 3. First, local mirroring requires identical disk drives. Thus, if the primary storage disk drive is upgraded, the mirrored storage disk drive must be likewise upgraded. Second, local mirroring requires that these identical drives be on the same computer system (e.g., 300 in FIG. 3). While it may be possible to achieve some degree of physical separation between primary storage and mirrored storage within the same computer system, the local mirroring still requires that the primary and mirrored storage be on the same computer system. A catastrophic event at a site (e.g., earthquake, fire, etc.) could easily result in destruction of both the primary storage and the mirrored storage. For this reason, local mirroring is not a suitable protection against catastrophic site failure. A concept known in the art as "logical mirroring" allows mirroring data across geographically remote locations between non-identical disk drives.

Logical mirroring, like physical mirroring, requires that operations on the mirrored storage be performed in a way that assures that data dependencies between operations are satisfied. In all physical mirroring systems, data dependencies are satisfied by enforcing the same order of operations on the mirrored system as on the primary system. Enforcing the same order in a logical mirrored system, however, results in performance penalties that are not acceptable in most applications. Without a way for mirrored storage to achieve parallelism in operations that do not conflict with each other, while serializing the order of operations that do conflict, the computer industry will continue to suffer from inefficient ways of performing logical mirroring.

DISCLOSURE OF INVENTION

An apparatus and method provides the capability of mirroring storage from a primary system to a mirrored system in a way that uses parallelism in the mirrored system to maximize the efficiency of writing data to the mirrored storage for operations that do not conflict while serializing operations that do conflict. The mirroring of the present invention is "logical mirroring", which does not require identical disk drives, and which supports mirroring between geographically remote locations to protect against catastrophic site failure. Parallelism is achieved in the mirrored system by dividing the virtual address space into multiple ranges, and by assigning a group of tasks to each range. When an operation is received on the mirrored system, the virtual address range that the operation affects is determined, and the operation is then delegated to the task group that corresponds to the affected virtual address range. By dividing the virtual address space into ranges, tasks in different ranges (i.e., in different task groups) may execute in parallel without any threat of conflict, and even tasks within the same range may execute in parallel if they operate in different portions of the range.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 10 is a block diagram of an active task table that tracks tasks and the address ranges they are working on.

BEST MODE FOR CARRYING OUT THE INVENTION

The preferred embodiments provide a way to speed the process of writing data on a mirrored storage by providing multiple tasks that may perform writes to the mirrored storage in parallel for operations that do not conflict while serializing operations that do conflict.

Figure 1:
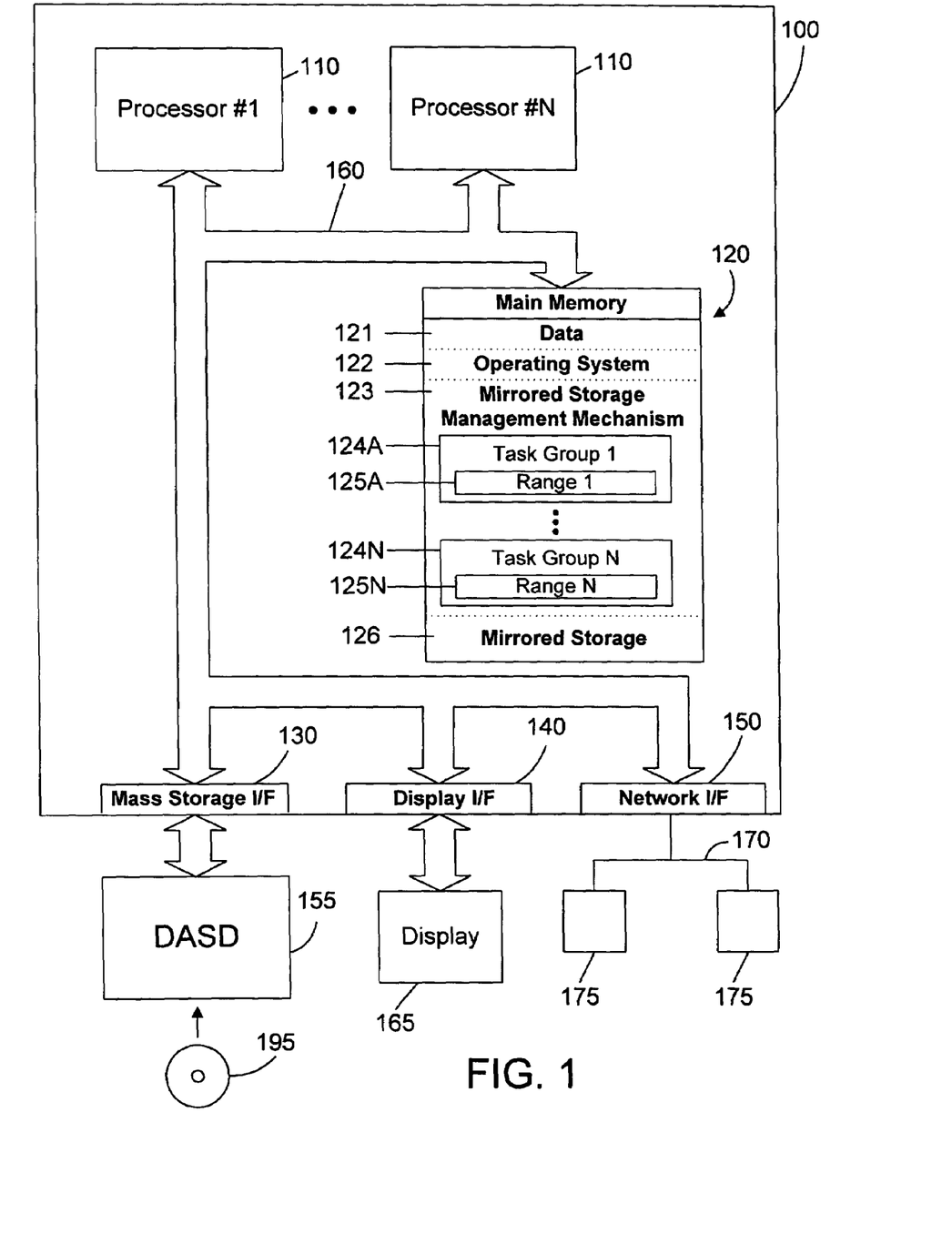
FIG. 1 is a block diagram of a computer apparatus in accordance with the preferred embodiments.

Referring to FIG. 1, a computer system 100 is an enhanced IBM eServer iSeries computer system, and represents one suitable type of computer system in accordance with the preferred embodiments. Those skilled in the art will appreciate that the mechanisms and apparatus of the present invention apply equally to any computer system. As shown in FIG. 1, computer system 100 comprises one or more processors 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195.

Main memory 120 contains data 121, an operating system 122, a mirrored storage management mechanism 123, and mirrored storage 126. Data 121 is any data that may be read or written by any processor 110 or any other device that may access the main memory 120. Operating system 122 is a multitasking operating system, such as OS/400, AIX, or Linux; however, those skilled in the art will appreciate that the spirit and scope of the present invention is not limited to any one operating system. Any suitable operating system may be used. Operating system 122 is a sophisticated program that contains low-level code to manage the resources of computer system 100. Some of these resources are processor 110, main memory 120, mass storage interface 130, display interface 140, network interface 150, and system bus 160.

Mirrored storage management mechanism 123 is a mechanism that allows a single task that receives operations for the mirrored storage 126 to distribute the work load of performing those operations among multiple tasks. Mirrored storage management mechanism 123 includes a plurality of task groups 124, shown in FIG. 1 as task group 124A to task group 124N. Each task group corresponds to a specified range 125 of virtual address space, shown in FIG. 1 as range 125A to range 125N. The virtual address space that corresponds to the mirrored storage 126 is divided up into multiple ranges, and each range is then assigned a task group 124 that includes one or more tasks that operate on virtual addresses in the range. Note that any suitable portion of the virtual address space may be divided into ranges, from all of the virtual address space to only a portion of the virtual address space that corresponds to data that may be written to mirrored storage 126. By dividing virtual memory into ranges and assigning a different task group to each range, operations to different ranges may be performed in parallel. In addition, mirrored storage management mechanism 123 includes logic that allows tasks within a given task group to work on different portions of their range in parallel. Mirrored storage management mechanism 123 also includes locks and logic that assure that operations that depend on each other (i.e., operations that affect the same portion of memory) are performed in the correct order. Mirrored storage 126 in main memory 120 is representative of a large datastore. DASD 155 is one suitable example of a datastore that could serve as mirrored storage 124.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, mirrored storage management mechanism 123, and mirrored storage 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the operating system 122.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 4:
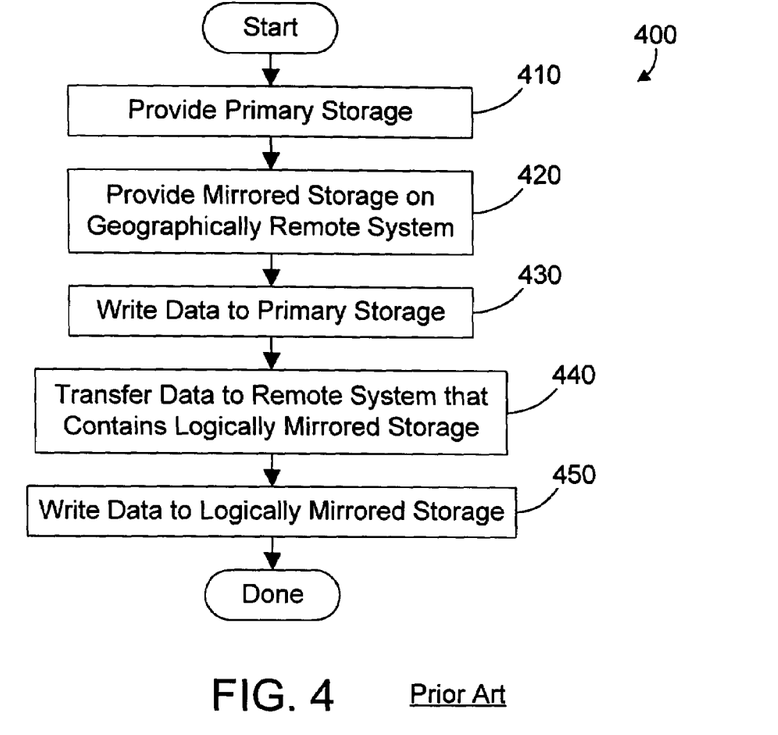
FIG. 4 is a flow diagram of a prior art method for performing logical mirroring.

Referring now to FIG. 4, a prior art method 400 is a method for logical mirroring. Method 400 begins by providing the primary storage (step 410) and providing mirrored storage on a geographically remote system (step 420). Data is then written to the primary storage (step 430). The data written to primary storage is transferred to the remote system that includes the logically mirrored storage (step 440). The data is then written to the logically mirrored storage (step 450). One significant advantage of logical mirroring is that the primary storage and mirrored storage need not be identical disk drives. The mirrored storage may be any arrangement and configuration of one or more drives that provides at least the capacity of the primary storage. Note that the term "geographically remote" is not used herein to denote any minimum distance between the primary storage and the mirrored storage, but is used to broadly represent any geographic separation of the primary storage from the mirrored storage. In the most preferred implementation, the primary storage and the mirrored storage are in separate buildings. This configuration allows the mirrored storage to survive if a catastrophe destroys the building in which the primary storage is housed but leaves the building with the mirrored storage intact. However, method 400 may be applied to any suitable degree of geographic separation between primary storage and mirrored storage, from separation of a few inches to separation of hundreds or thousands of miles. By allowing logical mirroring to a system that is a substantial distance from the primary storage, the likelihood that a catastrophe that affects the primary storage would also affect the mirrored storage is reduced.

Figure 5:
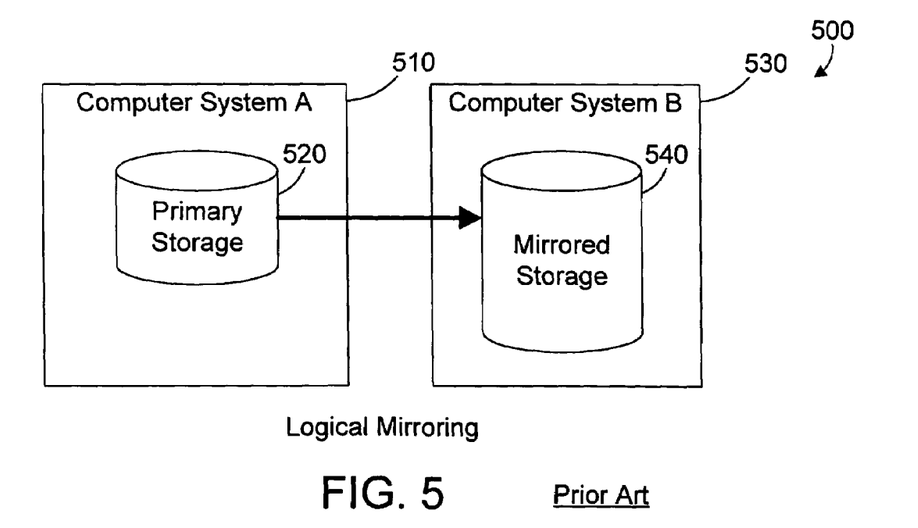
FIG. 5 is a block diagram of a prior art computer system that supports logical mirroring.

A networked computer system 500 on which method 400 in FIG. 4 may be performed is shown in FIG. 5 to preferably include two separate computer systems 510 and 530 that may be located in locations that are geographically remote from each other. This type of mirroring is "logical" rather than "physical" because the primary storage and mirrored storage can be different sizes and types of disk drives. This is represented graphically in FIG. 5 by the mirrored storage 540 being larger than the primary storage 520. When an object needs to be written to primary storage 520, memory is allocated on the primary storage 520 that is sufficient to contain the object. The object is then written to the allocated pages on the primary storage 520. The space for the same number of pages is then allocated on the mirrored storage 540, and the data is then written to the mirrored storage 540.

An object on the primary storage could span multiple disk drives in mirrored storage. This is why this type of mirrored is referred to as "logical mirroring". All objects located on the primary storage are written to the mirrored storage, but there is no physical relationship between where these objects are stored on the primary and mirrored storage.

A problem with prior art method 400 and system 500 is that a single task in the mirrored computer system is typically used to read the data from the primary computer system. Having a single task perform all writes can be an unacceptable bottleneck to performance, because multiple tasks on the primary system typically write data to the primary storage, and a single task on the mirrored system thus has a hard time keeping up with the writes from multiple tasks on the primary system. The preferred embodiments provide a way for the single task that receives operations from the primary system to distribute the operations to multiple tasks on the mirrored computer system that allow greatly improving the speed of writing mirrored data. In effect, the preferred embodiments provide an enhancement to step 450 in FIG. 4, allowing the writing of the data to be performed by multiple tasks in parallel when operations do not conflict, while serializing operations that do conflict. The mechanisms and methods for achieving this parallelism and serialization are described in detail below.

Figure 6:
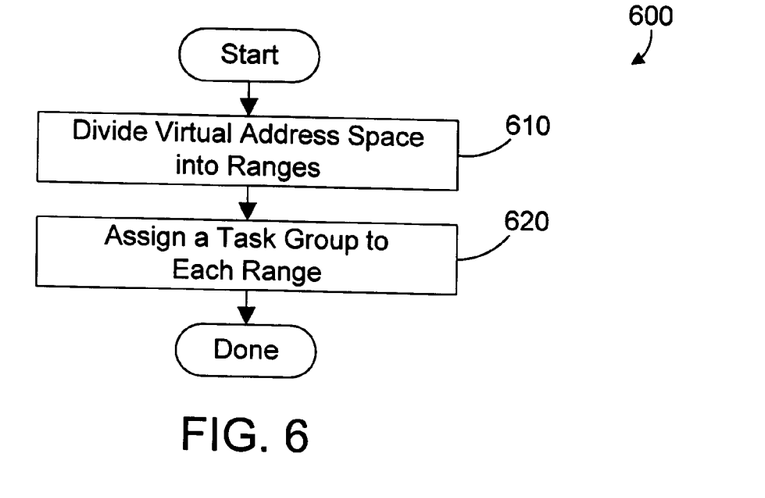
FIG. 6 is a flow diagram of a method in accordance with the preferred embodiments for setting up tasks groups dedicated to different virtual address ranges.

Referring to FIG. 6, a method 600 in accordance with the preferred embodiments divides virtual address space into multiple ranges (step 610). A task group is then assigned to each range (step 620). Note that the virtual address space that is divided into ranges in step 610 may be the total virtual address space for the mirrored computer system or may be some subset of the defined virtual address space. In the most preferred embodiments, the virtual address space that is divided into ranges in step 610 is the total virtual address space that may be used for disk operations. In an iSeries computer system, for example, an eight byte address is used. The three least significant bytes define an offset in a memory segment, while the five most significant bytes define different segments in memory. Note, however, that the total address space that may be used for disk operations in a Geographically Mirrored Independent Auxiliary Storage Pool on an iSeries computer system is from 0000000000000000(H) to 3FFFFFFFFFFFFFFF(H). Thus, for a specific example of an iSeries computer system, the virtual address space from 0000000000000000(H) to 3FFFFFFFFFFFFFFF(H) is divided into ranges in step 610 of FIG. 6.

Let's assume for the sake of illustration that the virtual address space from 0000000000000000(H) to 3FFFFFFFFFFFFFFF(H) in an iSeries computer system is divided into four different equally-sized ranges. The first range goes from 0000000000000000(H) to 0FFFFFFFFFFFFFFF(H). The second range goes from 1000000000000000(H) to 1FFFFFFFFFFFFFFF(H). The third range goes from 2000000000000000(H) to 2FFFFFFFFFFFFFFF(H). And the fourth range goes from 3000000000000000(H) to 3FFFFFFFFFFFFFFF(H). This is shown graphically in FIG. 7.

Figure 7:
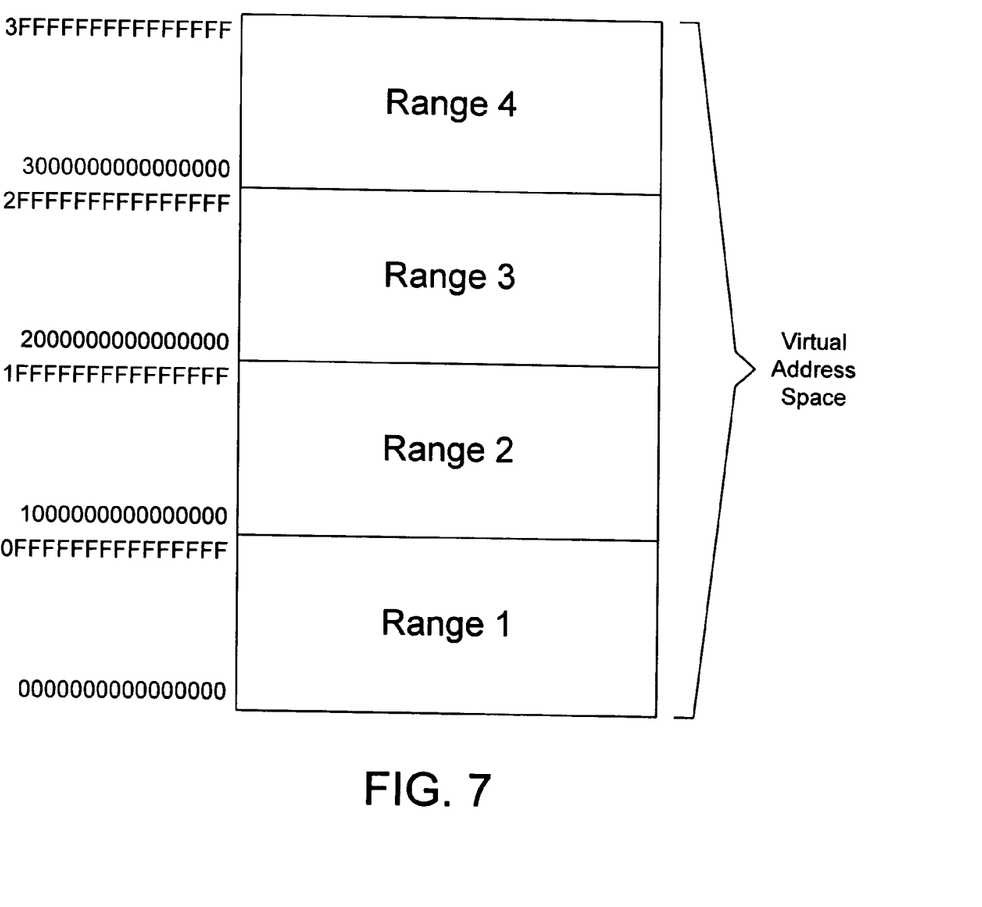
FIG. 7 is a block diagram showing a virtual address space divided into four ranges.
Figure 8:
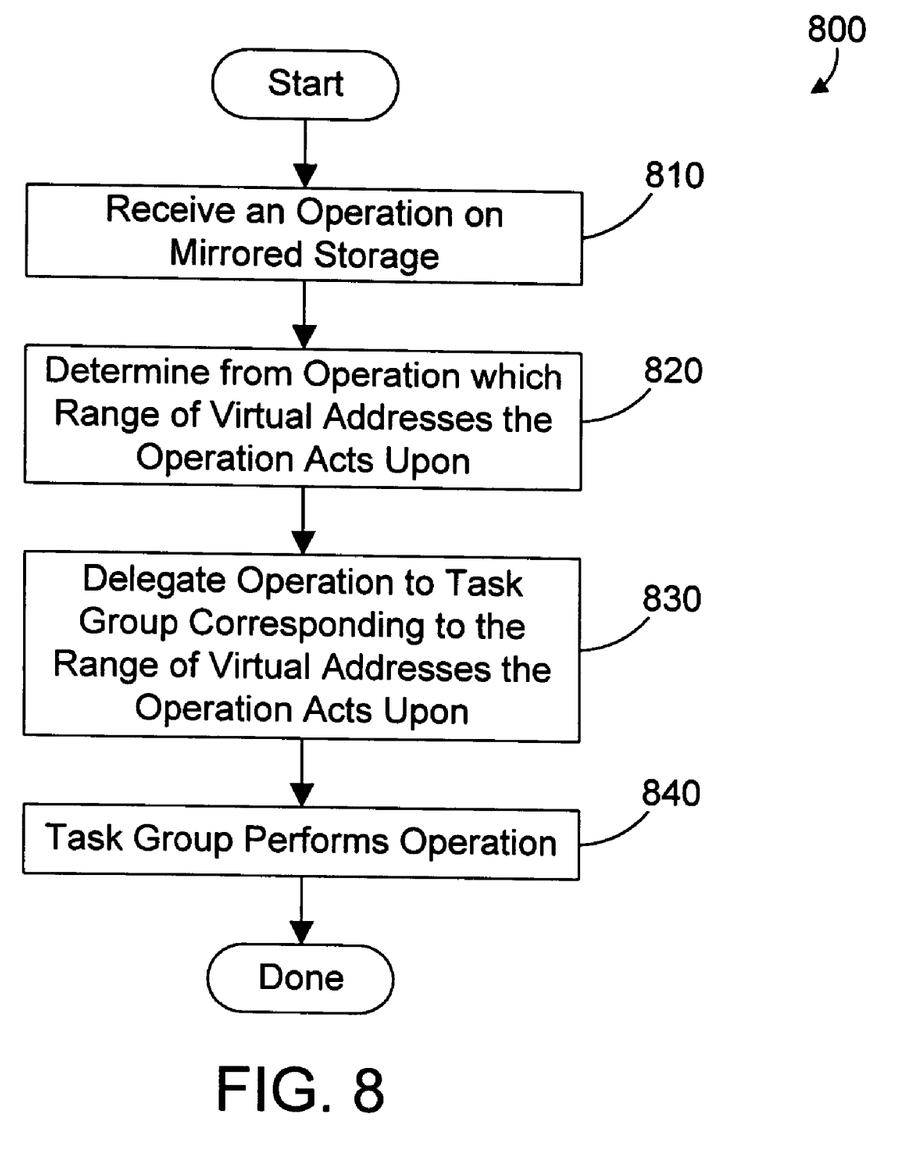
FIG. 8 is a flow diagram of a method for processing an operation on mirrored storage within the scope of the preferred embodiments.

By assigning a task group to each different range of virtual address space, the tasks in different task groups may operate in parallel with each other because they know their operations cannot conflict due to the different ranges of addresses defined for each task group. Once the virtual address space has been divided and the ranges are assigned task groups in method 600 of FIG. 6, operations to mirrored storage may be performed, as shown by method 800 in FIG. 8. First, an operation on the mirrored storage is received (step 810). Method 800 then determines from the operation which range of virtual addresses the operation acts upon (step 820). The operation is then delegated to the task group corresponding to a range of virtual addresses that includes the virtual addresses the operation acts upon (step 830). The task group then performs the operation (step 840). Note that method 800 is repeated each time an operation is received for the mirrored storage.

Note that an operation may operate on only a very small portion of a range. For example, lets assume for the sake of illustration that an operation affects a single page that begins at address 310000D400000000. Step 620 determines from the address of this page that the operation affects the fourth range that spans from 3000000000000000(H) to 3FFFFFFFFFFFFFFF(H). As a result, this operation will be delegated to the task group assigned to the fourth range (Range 4 in FIG. 7).

Figure 9:
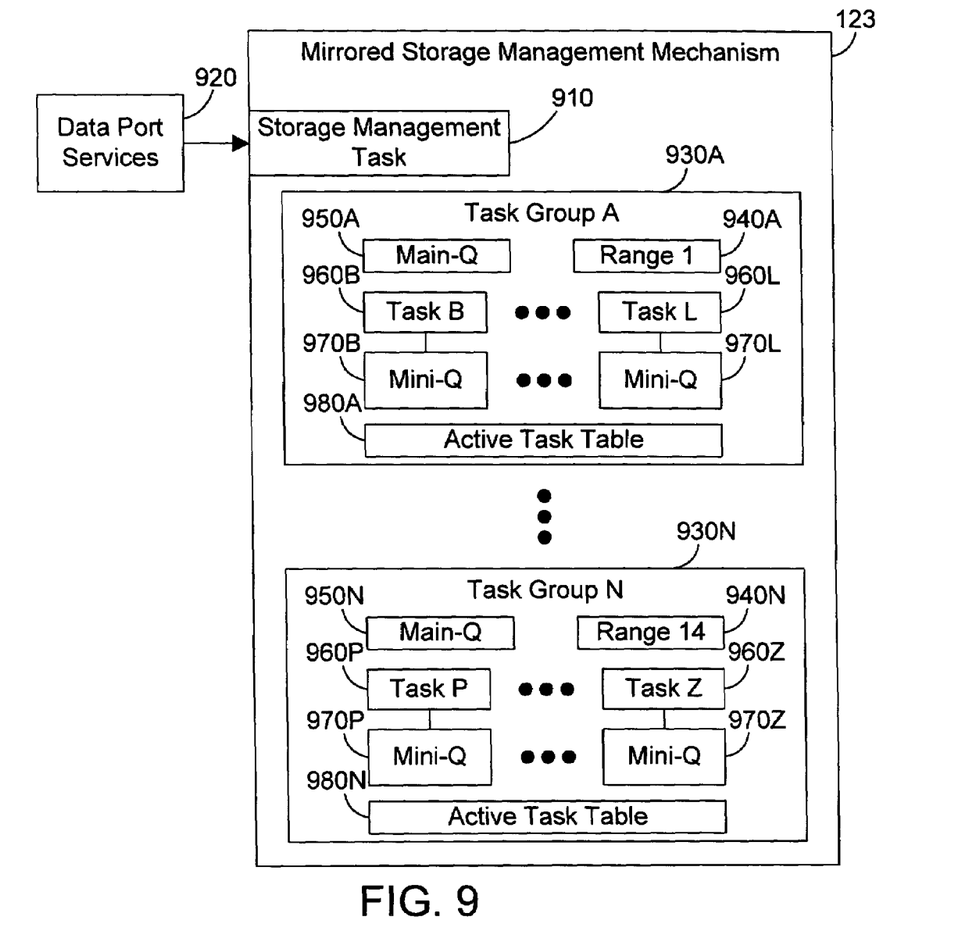
FIG. 9 is a block diagram showing one specific implementation of mirrored storage management mechanism 123 in FIG. 1 in accordance with the preferred embodiments.

A detailed implementation is now provided to illustrate the best mode of the invention. Referring to FIG. 9, the mirrored storage management mechanism 123 preferably includes a storage management task 910 that receives data from data port services 920, which receives operations for the mirrored storage from the primary computer system. As discussed above with reference to FIGS. 6 and 7, the virtual address space is divided into ranges, and a task group is assigned to each range. The tasks groups 930 are shown in FIG. 9 as 930A . . . 930N. Each task group includes its corresponding range 940, shown in FIG. 9 as 940A . . . 940N. Each task group further includes a main queue (Main-Q) 950, shown in FIG. 9 as 950A . . . 950N. Each task group also includes one or more tasks 960 with a corresponding mini queue (Mini-Q) 970. Thus, task group A 930A in FIG. 9 includes tasks 960B . . . 960L with their corresponding mini queues 970B . . . 970L. In similar fashion, task group N 930N in FIG. 9 includes tasks 960P . . . 960Z with their corresponding mini queues 970P . . . 970Z. Each task group also includes an active task table 980, shown in FIG. 9 as 980A . . . 980 N.

When storage management task 910 receives an operation for mirrored storage from data port services 920, the storage management task 910 delegates the operation to the task group corresponding to a range that includes the addresses affected by the operation. This delegation is performed by the storage management task 910 writing the operation to the main-Q 950 of the corresponding task group. Tasks in a task group include a mini-Q 970 which can also contain operations for the task. When a task completes an operation, it first determines whether there is another operation pending for the task on its mini-Q. If so, the task performs the operation. If not, the task dequeues from the main-Q 950 to receive the next operation. The addresses affected by the operation are determined, and the active task table is consulted to see if any tasks are currently working on an address range that includes the affected addresses. If no active task is working on an address range that includes the affected addresses, the current task makes an entry into the active task table and processes the operation itself. If one active task is working on an address range that includes the affected addresses, the current task delegates the operation to that same task by sending the operation to the active task's mini-Q. If two or more active tasks are working on an address range that includes the affected addresses, a counter is established with a count that reflects the number of active tasks working on the address range that includes the affected addresses, and a pointer to the counter is written to each active task working on the address range. When an active task working on the address range completes, it decrements the counter to indicate it has finished working on that range. Once the counter reaches zero, the current task knows it can process the operation.

Figure 10:
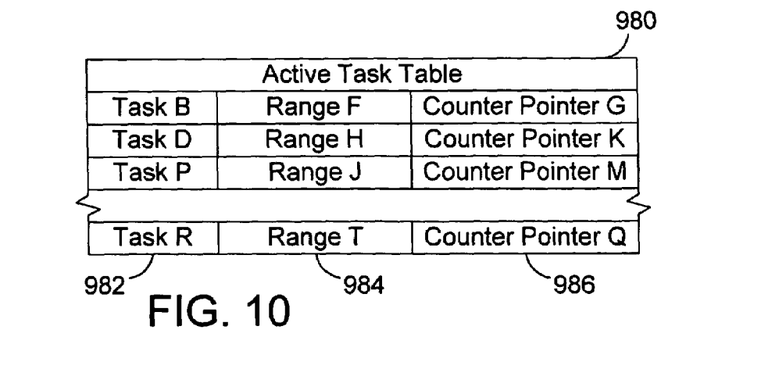

Referring now to FIG. 10, the active task table 980 for each task group includes three fields in each entry, namely a task identifier field 982, a range field 984, and a counter pointer field 986. Task identifier field 982 identifies a task that is currently working. Range field 984 specifies a range of virtual addresses that are being worked on by the identified task. Note that the ranges in range field 984 preferably indicate the exact range of virtual addresses the task is working on instead of specifying an entire range (such as Ranges 1–4 in FIG. 7). By specifying the portion of the range that the task is currently working on, each task group can determine whether there are parallel operations within the same defined range (e.g., Range 2 in FIG. 7) that may also be performed in parallel because they operate on different portions of the defined range. The counter pointer field 986 contains either NULL or a pointer to a counter. The function of the counter is explained in more detail below.

Figure 11:
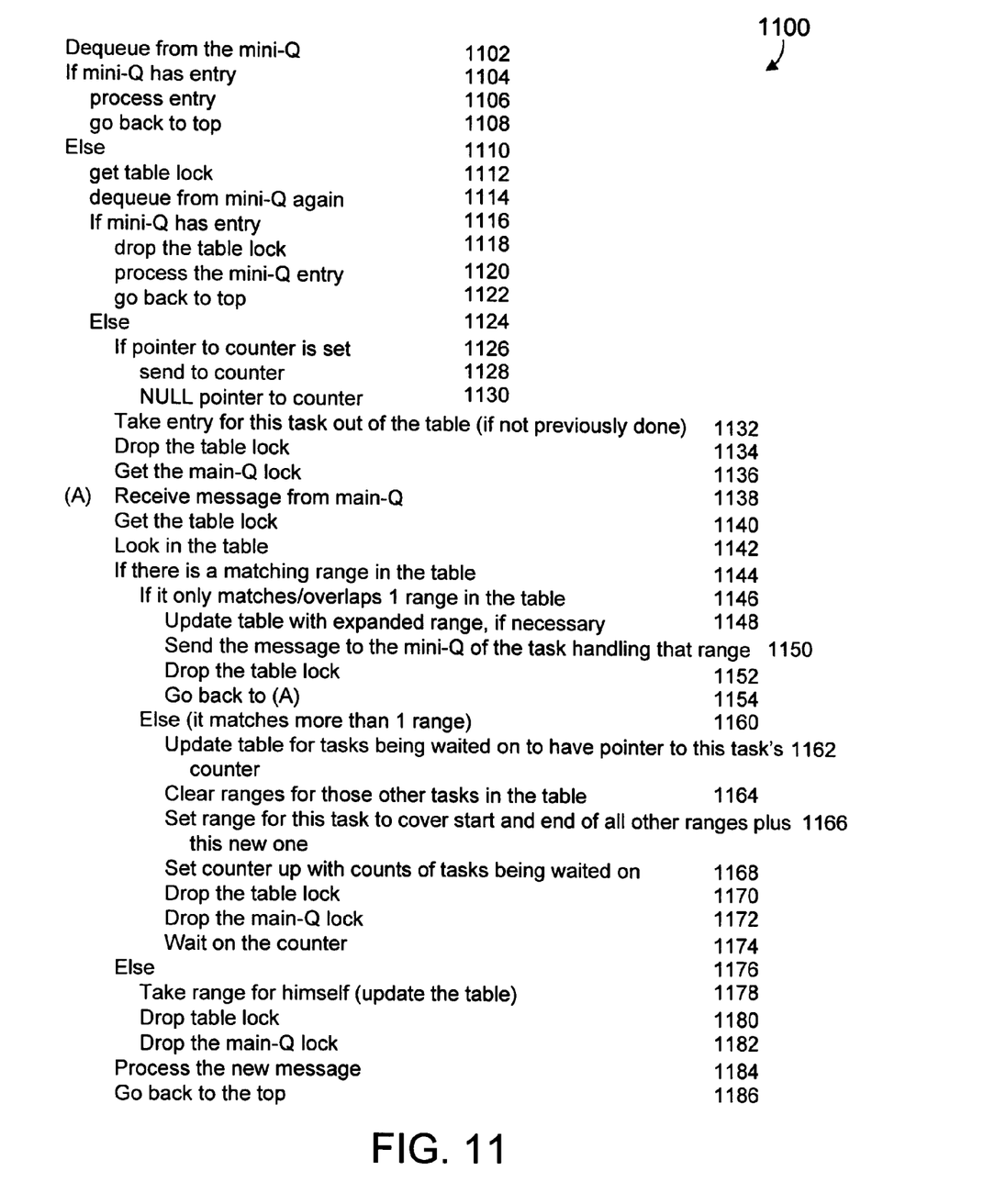
FIG. 11 is a diagram showing pseudo-code of a detailed method performed by the mirrored storage management mechanism 123 of FIG. 9.

A detailed method 1100 in FIG. 11 represents a method that may be performed by a task within a task group, as shown in FIG. 9. A task first dequeues from its own mini-Q (step 1102), which means it receives from its mini-Q to see if there is an entry on its mini-Q, which corresponds to a pending operation. If the mini-Q has an entry (step 1104), the entry is processed (step 1106) and method 1100 returns back to the top (step 1108). If the mini-Q has no entry (step 1110), the task gets the table lock (step 1112), then dequeues from its own mini-Q again (step 1114). If the mini-Q now has an entry (step 1116), the table lock is dropped (step 1118), the entry in the mini-Q is processed (step 1120), and method 1100 returns to the top (step 1122).

If the mini-Q still has no entry (step 1124), the task determines whether the task has a pointer to a counter set (step 1126). If the task has a non-null pointer to a counter, the task sends to the counter (step 1128), which decrements the counter value. The task's pointer to the counter is then set to NULL (step 1130). The counter is a mechanism that provides a type of lock. If a task needs to operate on a range of virtual addresses that are already being operated on by two or more other tasks, the counter is initialized to a value that represents the number of tasks operating on the addresses, and the pointers in those tasks are set to point to the counter. When each tasks completes its processing, it will decrement the counter in step 1128 and null its pointer in step 1130. When the value of the counter reaches zero, the task that set up the counter knows it can perform its operation. The counter thus provides a way to assure that proper order of operations are maintained for operations that operate on the same data.

The entry for this task is then taken out of the table, if this was not previously done (step 1132). The table lock is then dropped (step 1134), and the task gets the main-Q lock (step 1136). At this point the task dequeues from the main-Q (step 1138) and gets the table lock (step 1140). The task then looks in the table (step 1142). If there is a matching range in the table (step 1144), the task determines how many ranges in the table the task matches (or overlaps). If only one range matches (step 1146), steps 1148–1154 are performed. If more than one range matches (step 1160), steps 1162–1174 are performed. If no range matches (step 1176), steps 1178–1182 are performed.

If only one range matches, the operation may be delegated to the task already operating on that range. This is performed by updating the table, if necessary, to reflect an expanded range (step 1148), assuming that the new operation expands the range of virtual addresses being currently operated on by the task. A message is then sent to the mini-Q of the task handling that range (step 1150). The task then drops the table lock (step 1152) and goes back to label (A) (step 1154). If the virtual addresses for the operation match more than one range in the table (step 1160), the table is updated so the counter pointers of the conflicting tasks are set to point to the counter for this task (step 1162). The ranges for the conflicting tasks are then cleared (step 1164). An entry in the table corresponding to this task is then updated to cover the start and end of all other ranges plus this new range (step 1166). The counter is then initialized with a value that reflects the number of tasks this task is waiting on (step 1168). The task then drops the table lock (step 1170), drops the main-Q lock (step 1172) and waits on the counter to reach a value of zero (step 1174). Once the counter reaches a value of zero, the task resumes execution at step 1184.

If no range in the table matches (step 1176), the task takes the range for himself by updating the table (step 1178). The task then drops the table lock (step 1180) and drops the main-Q lock (step 1182). The new message is then processed (step 1184), and the task goes back to the top (step 1186).

The preferred embodiments achieve great parallelism on a mirrored computer system by providing a way for a single task to delegate operations to multiple parallel tasks based on the addresses that the operation affects. By dedicating tasks to specific address ranges, tasks in different tasks groups may always run in parallel with no fear of interference. In addition, parallelism within a task group can be achieved if tasks are working on different portions of the range corresponding to the task group. Note that the preferred embodiments are not limited to address ranges and physical I/O but extend to any data that can be partitioned into non-interfering groups.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   storage coupled to the at least one processor;
   a virtual address space divided into a plurality of ranges;
   a storage management mechanism residing in the memory and executed by the at least one processor, the storage management mechanism assigning a corresponding task group to each of the plurality of ranges, receiving an operation for the storage, determining a range of virtual addresses affected by the operation, and delegating the operation to a task group corresponding to one of the plurality of ranges that includes the range of virtual addresses affected by the operation.

2. The apparatus of claim 1 wherein the storage management mechanism allows a plurality of tasks within a task group to execute operations in parallel for operations that do not conflict, and serializes execution of operations that do conflict.

3. The apparatus of claim 1 wherein each task group has a corresponding main queue to which operations for the task group are sent and wherein each task within a task group has a corresponding mini queue to which operations for the task are sent.

4. The apparatus of claim 3 wherein the storage management mechanism further comprises a lock mechanism for assuring that only one task in a task group can access the corresponding main queue at one time.

5. The apparatus of claim 1 wherein the storage management mechanism further comprises a table that includes a plurality of entries, each entry specifying a task and a range of virtual addresses of at least one operation being executed by the specified task.

6. The apparatus of claim 5 wherein the storage management mechanism further comprises a lock mechanism for assuring that only one task in a task group can access the table at one time.

7. An apparatus comprising:
   at least one processor;
   a memory coupled to the at least one processor;
   storage coupled to the at least one processor;
   a virtual address space divided into a plurality of ranges;
   a storage management task executed by the at least one processor, the storage management task assigning a corresponding task group to each of the plurality of ranges, receiving an operation for the storage, determining a range of virtual addresses affected by the operation, and delegating the operation to a task group corresponding to one of the plurality of ranges that includes the range of virtual addresses affected by the operation, each task group comprising:
   a main queue to which operations for the task group are sent by the storage management task and are received by at least one task in the task group;
   for each task within a task group, a mini queue to which operations for the task are sent;
   a table that includes a plurality of entries, each entry specifying a task and a range of virtual addresses of at least one operation being executed by the specified task;
   a first lock mechanism for assuring that only one task in a task group can access the table at one time; and
   a second lock mechanism for assuring that only one task in a task group can access the main queue at one time.

8. A networked computer system comprising:
   (A) a first computer system comprising:
      primary storage; and
      a virtual address space;
   (B) a second computer system coupled to the first computer system, the second computer system comprising:
      mirrored storage;
      the virtual address space of the first computer system divided into a plurality of ranges;
      a mirrored storage management mechanism that assigns a corresponding task group to each of the plurality of ranges, receives an operation for the mirrored storage from the first computer system, determines a range of virtual addresses affected by the operation, and delegates the operation to a task group corresponding to one of the plurality of ranges that includes the range of virtual addresses affected by the operation.

9. A computer-implemented method for performing operations on storage in a computer system, the method comprising the steps of:
   dividing a virtual address space into a plurality of ranges;
   assigning a corresponding task group to each of the plurality of ranges;
   receiving an operation for the storage;
   determining a range of virtual addresses affected by the operation; and
   delegating the operation to a task group corresponding to one of the plurality of ranges that includes the range of virtual addresses affected by the operation.

10. The method of claim 9 further comprising the steps of:
    allowing a plurality of tasks within a task group to execute operations in parallel for operations that do not conflict; and
    serializing execution of operations that do conflict.

11. The method of claim 9 wherein each task group has a corresponding main queue, and further comprising the step of sending operations for the task group to the corresponding main queue.

12. The method of claim 11 further comprising the step of locking the main queue to assure that only one task in a task group can access the main queue at one time.

13. The method of claim 9 wherein each task within a task group has a corresponding mini queue, and further comprising the step of sending operations for the task to the mini queue.

14. The method of claim 9 further comprising the step of writing a plurality of entries to a table, each entry specifying a task and a range of virtual addresses of at least one operation being executed by the specified task.

15. The method of claim 14 further comprising the step of locking the table to assure that only one task in a task group can access the table at one time.

16. A computer-implemented method for performing operations on storage in a computer system, the method comprising the steps of:
dividing a virtual address space into a plurality of ranges;
assigning a corresponding task group to each of the plurality of ranges, each task group having a corresponding main queue and each task within a task group having a corresponding mini queue;
receiving an operation for the storage;
determining a range of virtual addresses affected by the operation; and
delegating the operation by sending the operation to the main queue of a selected task group corresponding to one of the plurality of ranges that includes the range of virtual addresses affected by the operation.

17. The method of claim 16 further comprising the step of locking the main queue of the selected task group to assure that only one task in the selected task group can access the main queue at one time.

18. The method of claim 16 further comprising the step of sending operations for a task to the corresponding mini queue.

19. The method of claim 16 further comprising the step of writing a plurality of entries to a table, each entry specifying a task and a range of virtual addresses of at least one operation being executed by the specified task.

20. The method of claim 19 further comprising the step of locking the table to assure that only one task in a task group can access the table at one time.

21. A computer-implemented method for copying primary storage in a first computer system to mirrored storage in a second computer system, the method comprising the steps of:
writing data to the primary storage;
assigning a corresponding task group to each of a plurality of ranges in a virtual memory space;
receiving an operation for the mirrored storage from the first computer system;
determining a range of virtual addresses affected by the operation; and
delegating the operation to a task group corresponding to one of the plurality of ranges that includes the range of virtual addresses affected by the operation.

22. A program product comprising:
a storage management mechanism that assigns a corresponding task group to each of a plurality of ranges in a virtual memory space, receives an operation for the storage, determines a range of virtual addresses affected by the operation, and delegates the operation to a task group corresponding to one of the plurality of ranges that includes the range of virtual addresses affected by the operation; and
computer readable recordable signal bearing media bearing the storage management mechanism.

23. The program product of claim 22 wherein the storage management mechanism allows a plurality of tasks within a task group to execute operations in parallel for operations that do not conflict, and serializes execution of operations that do conflict.

24. The program product of claim 22 wherein each task group has a corresponding main queue to which operations for the task group are sent and wherein each task within a task group has a corresponding mini queue to which operations for the task are sent.

25. The program product of claim 24 wherein the storage management mechanism further comprises a lock mechanism for assuring that only one task in a task group can access the corresponding main queue at one time.

26. The program product of claim 22 wherein the storage management mechanism further comprises a table that includes a plurality of entries, each entry specifying a task and a range of virtual addresses of at least one operation being executed by the specified task.

27. The program product of claim 26 wherein the storage management mechanism further comprises a lock mechanism for assuring that only one task in a task group can access the table at one time.

28. A program product comprising:
(A) a storage management mechanism that assigns a corresponding task group to each of a plurality of ranges in a virtual address space, receives an operation for the storage, determines a range of virtual addresses affected by the operation, and delegates the operation to a task group corresponding to one of the plurality of ranges that includes the range of virtual addresses affected by the operation, each task group comprising:
a main queue to which operations for the task group are sent by the storage management task and are received by at least one task in the task group;
for each task within a task group, a mini queue to which operations for the task are sent;
a table that includes a plurality of entries, each entry specifying a task and a range of virtual addresses of at least one operation being executed by the specified task;
a first lock mechanism for assuring that only one task in a task group can access the table at one time; and
a second lock mechanism for assuring that only one task in a task group can access the main queue at one time; and
(B) computer readable recordable signal bearing media bearing the storage management mechanism.

* * * * *